Feb. 7, 1967  H. W. MOCKER  3,302,448
APPARATUS FOR SUPERVISING THE PROPORTION OF
A MAGNETICALLY ACTIVE COMPONENT IN A FLUID
Filed Sept. 26, 1963  5 Sheets-Sheet 1

INVENTOR.
HANS W. MOCKER
BY
ATTORNEY

Feb. 7, 1967  H. W. MOCKER  3,302,448
APPARATUS FOR SUPERVISING THE PROPORTION OF
A MAGNETICALLY ACTIVE COMPONENT IN A FLUID
Filed Sept. 26, 1963  5 Sheets-Sheet 2

INVENTOR.
HANS W. MOCKER
BY George M. Field
ATTORNEY

INVENTOR.
HANS W. MOCKER
BY
ATTORNEY 3,302,448
APPARATUS FOR SUPERVISING THE PROPORTION OF A MAGNETICALLY ACTIVE COMPONENT IN A FLUID
Hans W. Mocker, Columbia Heights, Minn., assignor to Honeywell Inc., a corporation of Delaware
Filed Sept. 26, 1963, Ser. No. 311,763
6 Claims. (Cl. 73—23)

This invention relates to the field of control apparatus, and more particularly to apparatus for giving an output which is representative of the magnitude of the magnetically active component in a mixture of fluids.

It is a principal object of the invention to provide apparatus responsive to the magnitude of the magnetically active component of a gas mixture, when said component is oxygen, a paramagnetic gas. Another object is to provide a fluid bridge which is automatically unbalanced by variation in the magnetically active component of a gas mixture flowing through the bridge, and is rebalanced mechanically so that the extent of the rebalancing operation is a measure of said varation. A subordinate broad object of the invention is to provide improved differential flow control means for use in adjusting the balance of a fluid bridge in extremely fine increments.

Various other objects, advantages, and features of novelty, not individually numerated above, which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there are illustrated and described certain preferred embodiments of the invention.

Figure 1:
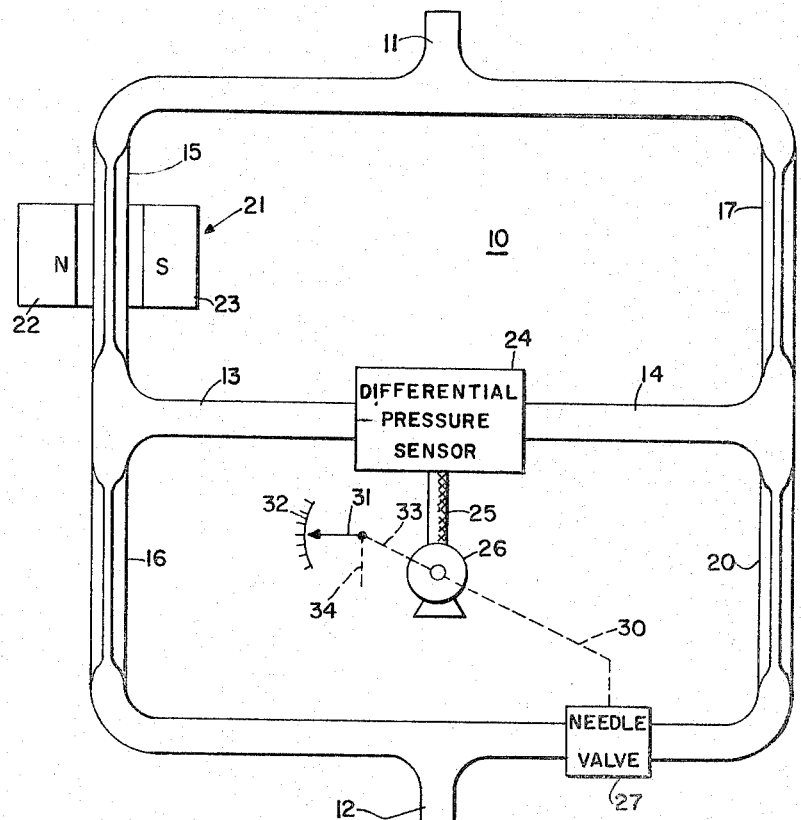
Figure 6:
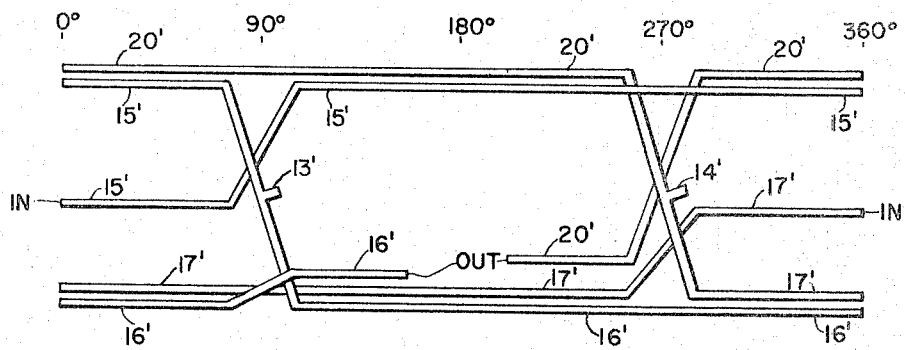
Figure 3:
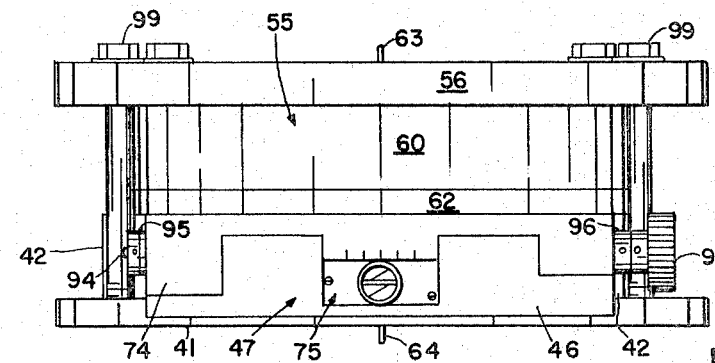
Figure 2:
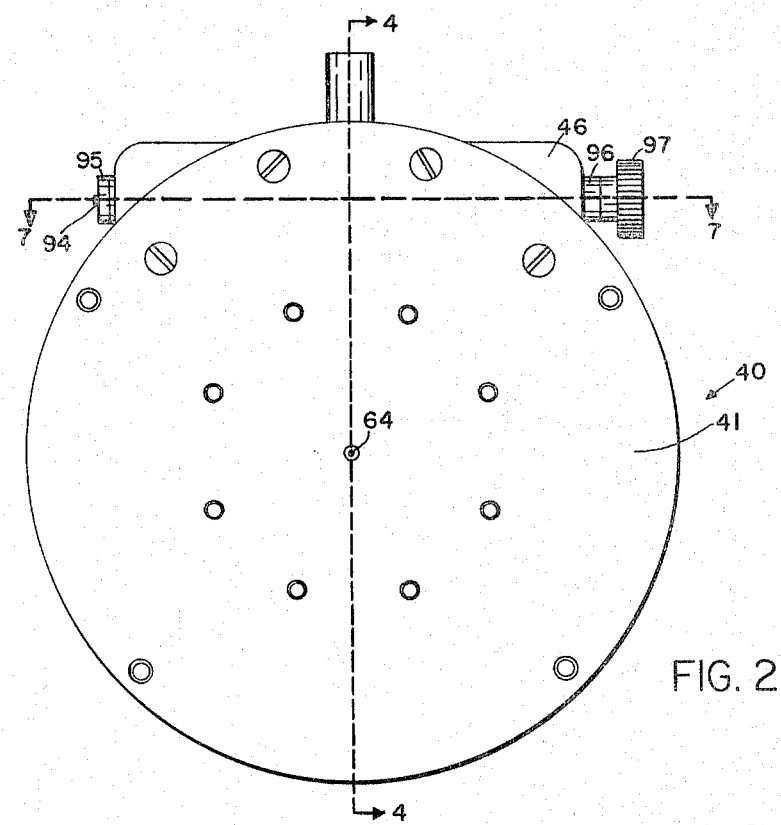
Figure 9:
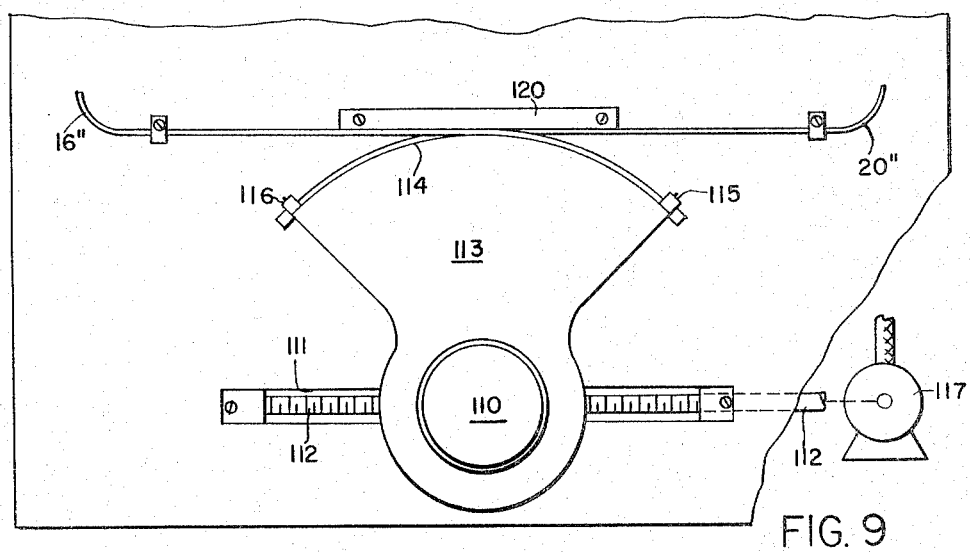
Figure 4:
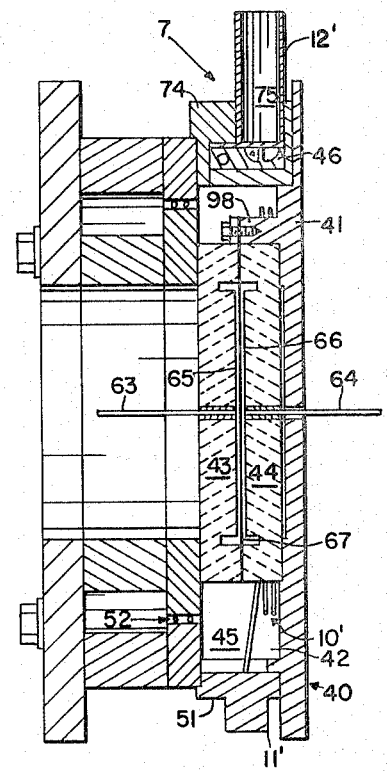
Figure 5:
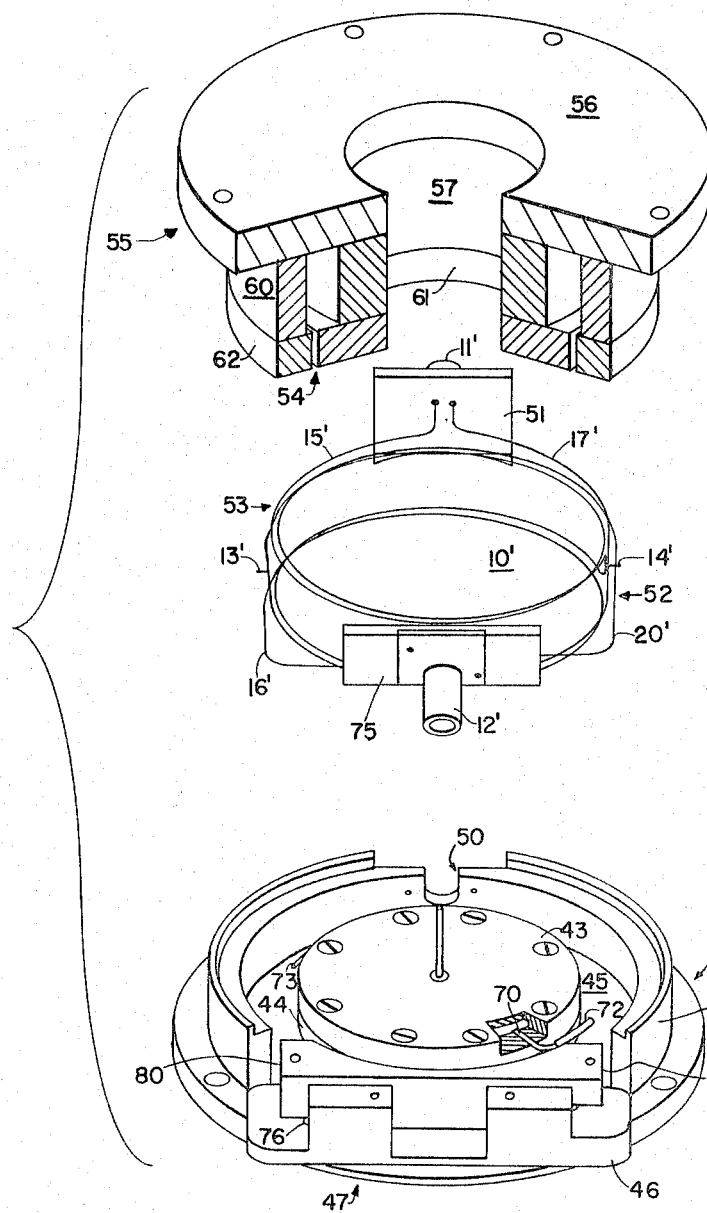
Figure 7:
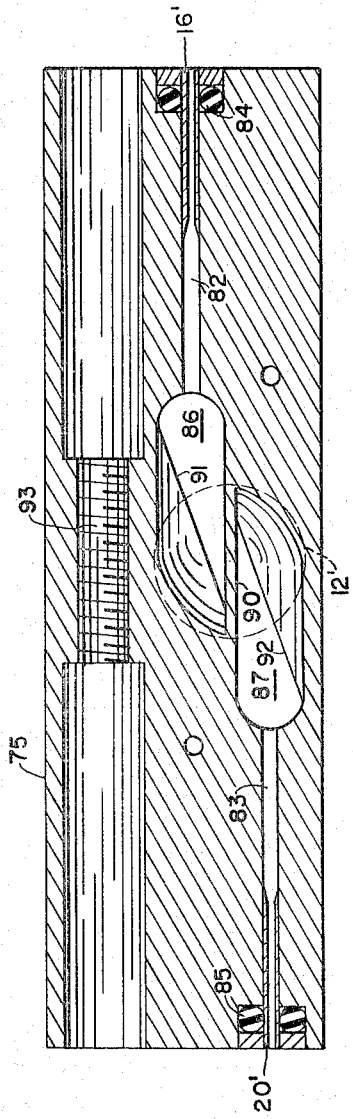
Figure 8:
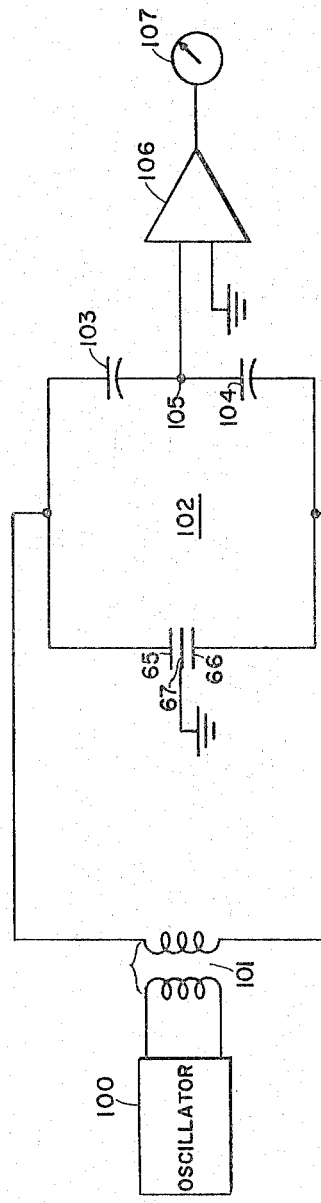

In the drawing FIGURE 1 is a schematic showing of the principles underlying the invention, FIGURE 2 is a bottom view of a preferred embodiment of the invention, FIGURE 3 is a view of the preferred embodiment in elevation, FIGURE 4 is a section taken along the line 4—4 of FIGURE 2, FIGURE 5 is an exploded view of the preferred embodiment, certain parts being omitted for clarity of illustration, FIGURE 6 is a developed representation of the fluid bridge used in the preferred embodiment, FIGURE 7 is a fragmentary sectional view taken along the line 7—7 of FIGURE 2, FIGURE 8 is a schematic showing of circuitry for use with the preferred embodiment, and FIGURE 9 shows a modified flow control device.

Fluids, and more particularly gases, may be somewhat arbitrarily divided into those which are magnetically active and those which do not show appreciable magnetic activity. The expression "magnetically active" is used herein to refer to fluids which are either paramagnetic or diamagnetic. The molecules of such fluids exhibit permanent magnetic moments and hence experience an orientation effect in a magnetic field. If such a fluid is undergoing viscous, laminar flow in a conduit, and is subjected to a magnetic field, the effective cross section for collision of the molecular dipoles changes, resulting in a decrease in the viscosity of the fluid or an apparent decrease in the resistance of the conduit to gas flow.

The use of a fluid bridge to investigate this property of oxygen, a paramagnetic gas of high susceptibility and other pure gases such as nitric oxide, has been suggested. The present invention resides in providing means for applying the above principle of nature to the determination of the oxygen content of a mixture of gases, when oxygen is the only magnetically active component of the mixture. Obviously the same invention could also be used for determination of nitric oxide in the absence of any other magnetically active gas.

FIGURE 1 shows the apparatus schematically to comprise a fluid bridge 10 having input connections 11 and 12, output connections 13 and 14, and conduit arms 15, 16, 17, and 20, which for most applications should be of capillary size. The size of the conduit arms is determined by the Reynolds number for critical flow of the gas being supplied to the bridge, since operation of the bridge is not reliable if the gas flow therethrough is other than viscous and laminar.

The gas mixture to be investigated flows through the bridge from 11 to 12, and suitable pressure regulating means may be provided at 11 if desired, to prevent total-pressure variations from influencing the apparatus.

A strong magnetic field is maintained transverse to arm 15 of the bridge by a permanent magnet structure 21 having a north pole 22 and a south pole 23, and at least arm 15 must be of magnetically transparent material. It is advantageous to use conduit which is as small as possile so that the distance between poles 22 and 23 may be held to a minimum, thus increasing the strength of the field acting on the gas mixture in the conduit for any particular strength of magnet. A second magnetic field may be provided transverse to conduit arm 20 if the effect of a single magnet is not sufficiently pronounced.

A differential pressure sensor 24 is connected to output connections 13 and 14, and supplies on a cable 25 an electrical output which controls the operation of a reversible motor 26. Sensor 24 may be of conventional double-bellows construction, as is taught in Kutzler Patent 3,045,492, controlling an electrical pickoff to energize a motor control amplifier, or may comprise a fluid amplifier controlling the operation of a fluid motor, also conventional.

When bridge 10 is balanced there is no pressure difference across sensor 24, and no operation of motor 26 takes place. If the bridge is unbalanced in one sense or the other, the resulting signal on cable 25 causes operation of motor 26 in one direction or the other, to open or close a fluid control device 27, such as a needle valve, by means of a mechanical connection 30. When the resulting new setting of device 27 is such that the bridge is again balanced, operation of motor 26 ceases.

The showing of device 27 is illustrative only. The extent of unbalance of the fluid bridge with changes in the oxygen content of the fluid is so slight that the usual needle valve operates too coarsely to permit successful operation of the system. The change in flow resistance due to change in the magnetically active component of a gas mixture is very small, and calls for a very precise rebalancing device if the system is to be operative. Two specially designed flow control devices will be described below which make possible the extremely small adjustments of flow resistance required to balance the bridge.

At the same time that motor 26 adjusts valve 27, it also adjusts an index 31 with effect to a scale 32 through a second mechanical connection 33, which may be extended at 34 to perform any desired control function such as operation of an oxygen supply valve for example. The expression "supervisory means" as used herein is intended to cover the closed loop apparatus including the fluid bridge, the differential pressure sensor, motor 26, and controlled shaft 34 with or without indicator 31/32.

The apparatus in its initial condition is so arranged that, with a magnetically inactive gas flowing through the bridge at the regulated pressure, index 31 is at zero on scale 32. Then as the proportion of oxygen in the gas mixture increases, the mean flow resistance of arm 15 decreases accordingly, unbalancing bridge 10 and causing operation of motor 26 to increasingly close device 27 and give an increasing indication on scale 32.

While the apparatus of FIGURE 1 is readily constructed of glass for laboratory use, it is too fragile and bulky in this form to be successful in certain special applications, as for example in monitoring the oxygen content of inhabited space vehicles during and after takeoff. A more rugged, preferred embodiment of this invention is shown in FIGURES 2-7, and will now be described.

A base member generally indicated by the reference numeral 40 is shown to comprise an end plate 41 and an upstanding wall 42 in the general form of a hollow cylinder. Secured to member 40 are a pair of ceramic discs 43 and 44 forming a portion of sensor 24 of FIGURE 1 and discussed more fully below: the discs are concentric with wall 42 and are spaced inwardly from it to provide an annular channel 45 therebetween.

Wall 42 is cut away over a relatively large part of its circumference to receive the body 46 of a flow control device 47, and is cut away at an opposite location 50 to accept a mounting plate 51 carrying input connection 11' of fluid bridge 10'. The bridge has a lower portion 52, which is received in channel 45, and an upper portion 53, which extends above the surface of member 40, to be received in the annular space 54 between the poles of a permanent magnetic structure 55. Structure 55 includes a cover plate 56 of soft iron, a pair of annular permanent magnets 57 and 60, and a pair of annular soft iron pole shoes 61 and 62. Magnets 57 and 60 are cemented to plate 56 and shoes 61 and 62, and have their polar axes extending vertically as seen in FIGURE 5, so that the surface of magnet 60 in contact with plate 56 and the surface of magnet 57 in contact with shoe 61 are north poles. Then a strong magnetic field exists extending radially of the space 54 and is thus transverse to the upper portion 53 of bridge 10'.

The conduit arms of bridge 10' are of capillary stainless steel tubing, which is magnetically transparent, and they are bent into a rather intricate double helix configuration best understood by referring to FIGURE 6. That figure shows the configuration developed on a plane, the zero of angular measurement being taken at the center of plate 51. From FIGURE 6 it will be evident that bridge arms 15' and 20' are located in the magnetic field, while bridge arms 16' and 17' are located in space 45. This is the equivalent of FIGURE 1 with the additional magnet for arm 20, as described previously.

FIGURE 4 shows that discs 43 and 44 have slightly relieved central portions to provide two spaced parallel surfaces, and central conductors 63 and 64 are moulded into the discs during manufacture. The central surfaces are thereafter metallized, thus producing a pair of plane electrodes 65 and 66 connected to conductors 63 and 64 respectively. A thin diaphragm of metal foil or metalized plastic is clamped tautly between discs 43 and 44 to comprise a further electrode 67, and electrodes 65, 66, and 67 cooperate to comprise a pair of capacitors to which electrode 67 is common. A pair of ducts, of which duct 70 is shown, make connection with the spaces between electrodes 65 and 66 respectively and electrode 67 and are arranged to be connected by short pieces of rubber tubing 72 and 73 or other suitable means to output conduits 13' and 14' of bridge 10'.

A cap 74 cooperates with body 46 of flow control device 47 to form an enclosure within which a control member 75 may slide linearly in a groove 76. Bridge conduit arms 16' and 20' are brought out through channels 80 and 81 between wall 42 and body 46 and are bent at right angles to be received in bores 82 and 83 in member 75 as shown in FIGURE 7. O-rings 84 and 85 are provided to allow sliding motion between the conduit arms and the control member without appreciable fluid leakage, and the conduit arms are held between body 46 and cap 74 to prevent their physical displacement.

Bores 82 and 83 communicate with enlarged chambers 86 and 87 separated by a partition 90: the chambers communicate independently with bridge connections 12', and preferably include fairing members 91, 92 to insure laminar flow of fluid from the chambers to the connection. Conduit arms 16' and 20' may also be internally faired at their ends for the same purpose.

An internally threaded bore 93 is provided in member 75 to receive a threaded shaft 94 passing freely through bores in cap 74 and held against linear movement with respect thereto by collars 95 and 96 pinned to the shaft or other suitable means. Shaft 94 is shown as provided with a manual knob 97 for causing rotation of the shaft, but it can of course be arranged for driving by a suitable motor if this is desired.

The device is assembled by inserting conduit arms 16' and 20' into control member 75. The assembly of bridge 10', plate 51 and control member 75 is next inserted into base member 40, and rubber tubes 72 and 73 are connected to bridge outputs 13' and 14'. Central electrode 67 is grounded to base member 40 in any suitable fashion, as by clamping a tab of this electrode to a boss 98 projecting upward from end plate 41. Plate 51 is secured to wall 42, and cap 74 is fastened to body 46. Magnet structure 55 is then carefully placed on base member 40 with the upper portion 53 of bridge 10' in the pole space 54, and the entire device is fastened together by suitable bolts 99.

When control member 75 is centrally located in slot 76 the distances from the ends of arms 16' and 20' to outlet 12' are equal and present equal resistance to fluid flow. As member 75 is displaced to the left or right the relative flow resistances for arms 16' and 20' are oppositely varied. The change in flow resistance thus accomplished is of a sufficiently small order of magnitude to make it suitable for rebalancing the bridge to correct for unbalances resulting from a change in the paramagnetic component of the gas flowing.

When the manual knob 97 is used for rebalancing the operator rotates it until the bridge unbalance, as sensed by the capacitors, has been reduced to zero: FIGURE 9 shows circuitry suitable for accomplishing this type of operation. An oscillator 100 is coupled through an isolating transformer 101 to energize a capacitance bridge 102 of which electrodes 65, 66, and 67 make up a first pair of adjacent arms, electrode 67 being grounded. The other pair of arms is made up of a pair of capacitors 103 and 104, one or both of which may be variable for initially setting the bridge at zero. The bridge output is taken at the common point 105 between capacitors 103 and 104, and is supplied through an amplifier 106 to a meter 107. If meter 107 is a d.c. instrument, amplifier 106 will naturally include a suitable demodulator, as is well known in the art.

FIGURE 9 shows an alternative form of fluid control having certain advantages. In this structure a pivot member 110 is arranged for linear displacement along a slot 111 by threadedly engaging a screw 112. A control arm 113 is pivoted on member 110, and has an arcuate surface 114. Bridge arms 16'' and 20'' run around surface 113 in opposite directions, and their ends are fastened to it at 115 and 116. The arrangement is such that when pivot 110 is centrally located along slot 111, equal lengths of bridge arms 16'' and 20'' extend arcuately beyond the point of tangency with control arm 113: the arms are thus symmetrical and hence present equal resistances to fluid flow. Shaft 112 is shown as coupled to a motor 117, which is energized like motor 26 of FIGURE 1.

As motor 117 drives shaft 112 in one direction or the other, pivot member 110 moves linearly and arm 113 is constrained to rotate thereabout, straightening one bridge arm and further bending the other, to decrease and increase respectively the flow resistances of the two arms. Again the order of magnitude of the change in flow resistance is comparable to the change resulting from variation in the paramagnetic component of the fluid. If desired a backing plate 120 may be provided on the other side of the bridge arms from control arm 113.

Numerous objects and advantages of the invention have been set forth in the foregoing description, together with details of the structure and function of the invention, and the novel features thereof are pointed out in the appended claims. The disclosure, however, is illustrative only, and I may make changes in detail, within the principle of the invention, to the full etxent indicated by the broad general meaning of the terms in which the appended claims are expressed.

I claim as my invention:

1. Means for determining the magnitude of the component, in a fluid mixture, of a magnetic active fluid comprising, in combination: a normally balanced fluid bridge connected to receive said fluid mixture; means applying a strong magnetic field to at least one of the arms of said bridge to unbalance the bridge in accordance with the magnitude of said component; means for causing modification of the flow resistance of at least one other arm of the bridge to rebalance the bridge, so that the extent of said modification is representative of the magnitude of said component; and output means connected to the last mentioned means.

2. In combination: a fluid bridge comprising two pairs of opposite arms severally offering such resistances to the flow of fluid therein that the bridge is normally balanced; means maintaining a magnetic field across one arm of said bridge to vary the flow resistance of said one arm, and hence to vary the condition of balance of said bridge, in accordance with the proportion of a magnetically active component in the fluid supplied to said bridge; rebalancing means operable to vary the flow resistance of at least one arm of said bridge, to further vary the condition of balance of said bridge; control means responsive to unbalance of said bridge for causing operation of said rebalancing means so as to rebalance said bridge; and supervisory means activated by said control means.

3. In combination: a fluid bridge including two pairs of opposite capillary arms connected to provide an input diagonal and an output diagonal, at least one of said arms being of magnetically transparent material; means maintaining a strong, substantially constant magnetic field ambient to at least said one of said arms, whereby to change the resistance of said one arm to the flow of magnetically active fluid therethrough, compared to the resistance of said one arm to the flow of magnetically inert fluid therethrough; control means connected to said bridge for giving an output determined by the pressure differential across said output diagonal and hence by the magnetically active component of said mixture; means adjustable to vary the flow resistance of at least one of said arms; means connecting the adjustable means for adjustment by said control means so as to maintain said pressure differential at a constant value regardless of variation in said magnetically active component of said mixture; and supervisory means activated by said control means.

4. In combination: a fluid bridge including two pairs of opposite capillary arms connected to provide an input diagonal and an output diagonal, at least one of said arms being of magnetically transparent material; means supplying to said input diagonal a mixture of fluids having a variable magnetically active component; means maintaining a strong, substantially constant magnetic field ambient to at least said one of said arms, whereby to change the resistance of said one arm to the flow of magnetically active fluid therethrough, compared to the resistance of said one arm to the flow of magnetically inert fluid therethrough; control means connected to said bridge for giving an output determined by the pressure differential across said output diagonal and hence by the magnetically active component of said mixture; means adjustable to differentially vary the flow resistance of an adjacent pair of said arms; means connecting the adjustable means for adjustment by said control means so as to maintain said pressure differential at a constant value regardless of variation in said magnetically active component of said mixture; and supervisory means activated by said control means.

5. In combination: means including an annular gap for producing a substantially constant magnetic field which extends radially across said gap; a pair of capillary tubes each comprising inlet and outlet sections, having substantially equal resistance to fluid flow, and an intermediate tap; differential pressure sensing means connected between the taps of said tubes; means connecting the inlet sections of said tubes to a source of fluid, said tubes being configured so that at least a portion of the inlet section of one tube and at least a portion of the outlet section of the other tube lies in said annular gap; and output means connected to said differential pressure sensing means.

6. In combination: means including an annular gap for producing a substantially constant magnetic field which extends radially across said gap; a pair of capillary tubes each comprising inlet and outlet sections, having substantially equal resistance to fluid flow, and an intermediate tap; differential pressure sensing means connected between the taps of said tubes; means connecting the inlet sections of said tubes to a source of fluid, said tubes being configured so that one section of one of said tubes lies in said annular gap; and output means connected to said differential pressure sensing means.

References Cited by the Examiner

UNITED STATES PATENTS

| 2,449,067 | 9/1948 | Guillemin | 73—23 |
| 2,506,179 | 5/1950 | Taplin | 138—43 |
| 2,646,078 | 7/1953 | Adams | 138—43 |
| 2,696,731 | 12/1954 | Luft | 73—23 |

FOREIGN PATENTS 1,002,147  2/1957  Germany.

RICHARD C. QUEISSER, *Primary Examiner.*

JULIUS FISHER, *Assistant Examiner.*